Dec. 13, 1932.   J. J. SANTIAGO   1,890,530
DRILL STEM BEARING
Filed Feb. 24, 1930   2 Sheets-Sheet 1
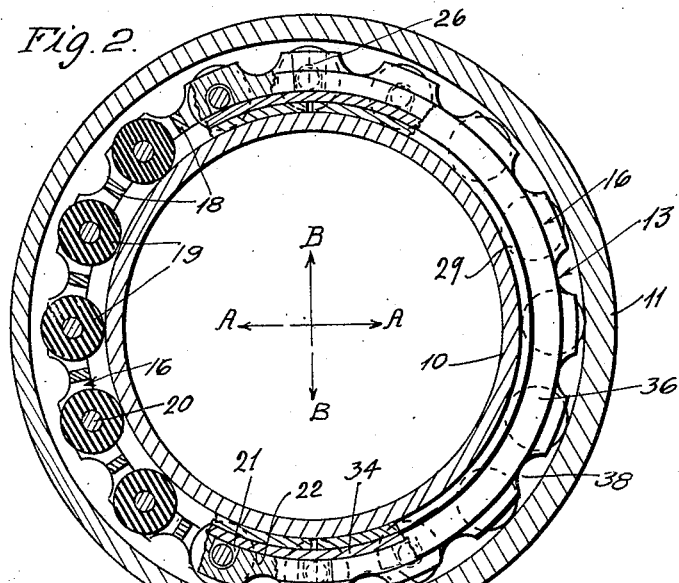
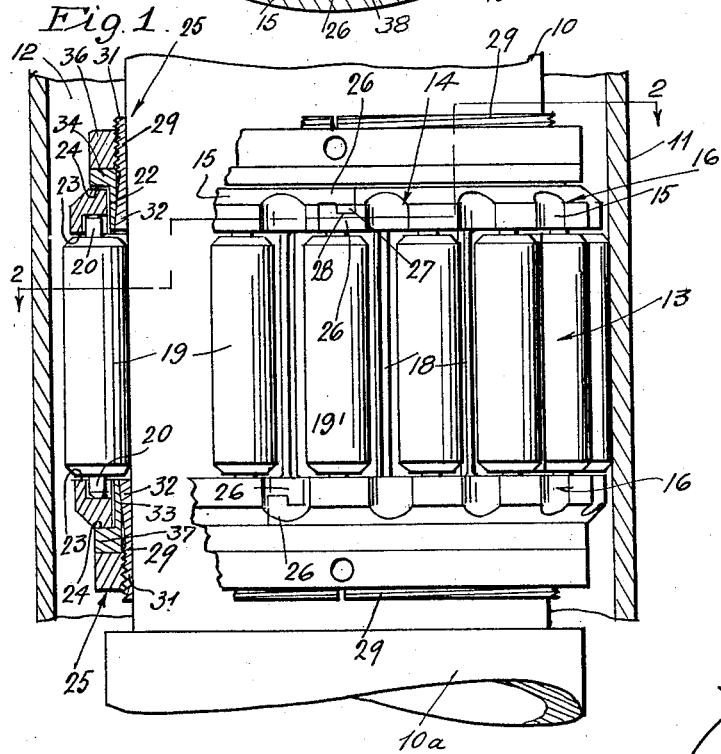
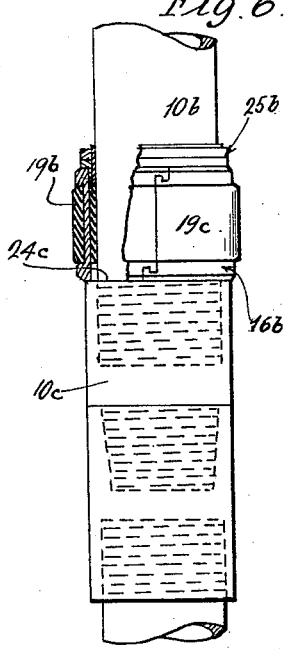
Inventor
James J. Santiago
Attorney.

Dec. 13, 1932.                J. J. SANTIAGO                1,890,530
                             DRILL STEM BEARING
                           Filed Feb. 24, 1930        2 Sheets-Sheet 2
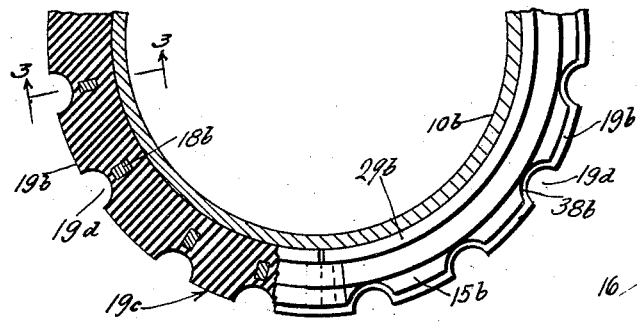
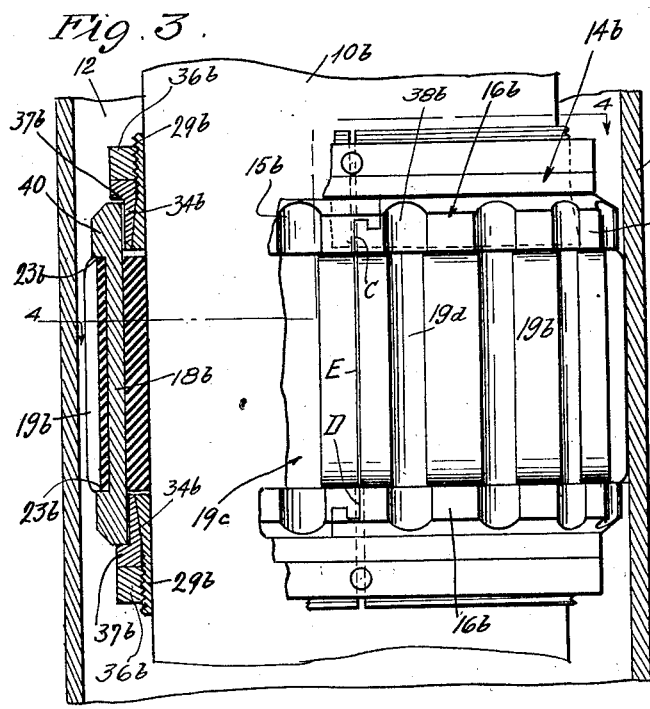
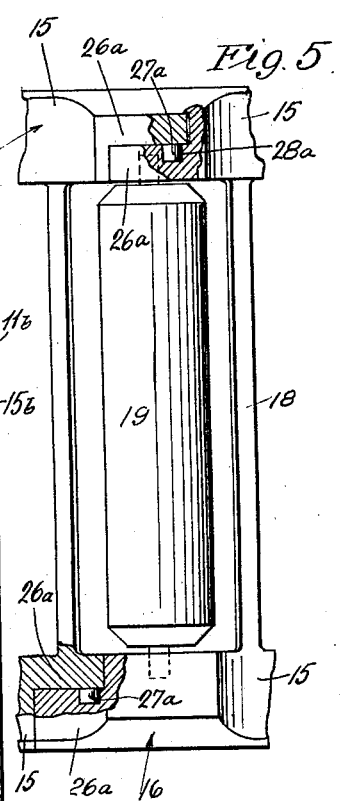
Inventor
James J. Santiago.
Attorney.

Patented Dec. 13, 1932

1,890,530

UNITED STATES PATENT OFFICE

JAMES J. SANTIAGO, OF LOS ANGELES, CALIFORNIA, ASSIGNOR TO JOHN GRANT, OF LOS ANGELES, CALIFORNIA

DRILL STEM BEARING

Application filed February 24, 1930. Serial No. 430,610.

This invention has to do generally with the deep well art and is more particularly concerned with devices for protecting well casings, tubing, and the like from abrasive and other damaging effects of drill stems, pump rods, and the like which are movable therethrough.

For purposes of simplicity, the description of the invention will be confined to installations on rotary drill stems, but this confinement is not to be considered as in any way limitative on the invention, considered in its broader aspects, for its advantageous application in analogous situations will be self-apparent to those skilled in the art.

It is well known that due to the abrasive and other effects arising from the engagement of unprotected drill stems with casing walls, such walls are frequently battered or worn through, with obvious damaging results. Hence, it has become more or less common practice to provide bearings at relatively frequent intervals along the stem, which bearings are interposed between stem and casing to take the wear incident to stem and casing engagement. It is with such bearings that my invention has to do.

The bearings here shown are directly engageable with but have a capacity for free bodily rotation about the stem, while the means employed for maintaing them against movement longitudinally along the stem are such that they may be readily and accurately applied irrespective of surface irregularities of the stem. The bearing elements may be in the form of sleeves or rollers, but irrespective of form they are preferably made of rubber, for it has been found that rubber bearing elements stand up much better than do metallic bearing elements under the peculiar service conditions obtaining in this particular field. The above named features are shown and claimed broadly in my copending application, filed under even date herewith Ser. No. 430,609 and entitled "Drill stem bearings".

As pointed out in said copending application, one of the most serious problems in connection with bearing installations is that of replacement, for most drill stem bearings require disjointing of the drill stem into individual pipe sections, and when it is considered that the stem may be eight thousand feet or more in length, it will be seen that the time consumed in such an operation represents a considerable cost item. In both the instant and copending application there is shown an assembly of segmental carrier segments held releasably in encircling association with the stem and wherein the bearing elements may be replaced without breaking the stem "stands" into sections, this replacement being accomplished without removing from the stem those elements which are depended upon for holding the bearing normally against movement longitudinally along the stem. This feature is claimed broadly in said copending application, while the more limited claims therein are drawn to the segmental characteristics of the carrier upon which the bearing elements are mounted; the utilization of a member movable longitudinally along the stem into and out of engagement with said segments near their adjacent ends to hold the segments against transverse displacement; and a particular mounting for bearing elements in the form of rollers.

It is an object of the present invention to provide a bearing having advantages of the type set up in said copending application with the additional feature of particular means for holding the segments against transverse displacement. This feature, to which certain of the instant claims are drawn, embodies the use of interengaging parts on the segments for holding them against transverse separative movement, the parts being engageable and disengageable by virtue of relative longitudinal movement of the segments.

In the instant application, certain of the claims are drawn to the segmental characteristics of the bearing element, while other claims are drawn to a particular association of a given bearing element segment and its associated carrier segment.

The general object of the present invention may be summed up as the provision of a drill stem bearing which is relatively simple and sturdy of construction, relatively cheap and easy to manufacture, assemble and install, and which has such characteristics that it effectively resists the various displacements and other strains to which it is exposed. Other objects and features of novelty will be made apparent in the following detailed description, in which:

Figure 1 is an elevation showing an embodiment of my invention applied to a drill stem within a conventionally indicated casing, the bearing being broken away at one side to show its cross-sectional characteristics;

Fig. 2 is a section taken on broken line 2—2 of Fig. 1;

Fig. 3 is a view generally similar to Fig. 1 but showing a variational form of bearing element; the sectional portion of the bearing being taken on line 3—3 of Fig. 4.

Fig. 4 is a fragmentary section on the broken line 4—4 of Fig. 3;

Fig. 5 is an enlarged fragmentary detail showing a variational form of interlock between carrier segments; and Fig. 6 illustrates the direct application of the bearing shown in Fig. 3 to a drill stem coupling.

Numeral 10 designates a section of usual tubular drill stem which is mounted in the usual manner (not shown) for rotation within well casing 11, the relative diameters of stem and casing being such that appreciable annular clearance 12 is left therebetween. Circulation fluid which passes through the bore of stem 10 is adapted to pass through the tool (not shown) at the lower end of the stem and thence upwardly through space 12, for reasons well known to those skilled in the art. Numeral 10a indicates a fragment of a usual coupling or tool joint whereby stem section 10 is coupled to the adjacent stem section (not shown) and the drill stem bearing generally indicated at 13 is ordinarily applied to section 10 adjacent to coupling 10a. However, it will be made apparent that the means for positioning the bearing longitudinally on the stem is such that it may be applied with equal effectiveness at any point between couplings.

Bearing 13 includes annular carrier 14 which is made up of a plurality of symmetrical segments 15. In the embodiment shown, these segments are two in number and therefore semi-circular, but it will be understood the invention contemplates broadly the provision of any desirable number of segments. The segments are adapted to be grouped in such association that they encircle the stem, and when in such association it will be seen that the carrier may be considered as made up of two rings 16 which are spaced apart longitudinally of the stem and held in axial alinement by longitudinally extending and angularly spaced ribs 18.

The bearing elements carried by cage 14 may be of any suitable type, those in Fig. 1 being rubber rollers 19 having axial pin ends 20. They are mounted for rotation in the following manner. Cut into rings 16 are the angularly spaced recesses 21, the recesses in the two rings being axially alined and opening both to the inner peripheral faces 22 of the rings and towards the opposed end faces 23 thereof. Pin ends 20 normally lie in these recesses and when segments 15 are detached from the stem, rollers 19 are bodily movable transversely of said segments into and out of mounted position, due to the inward opening of the recesses. Recesses 21 have such radial extent that when the carrier is applied to the stem, they will accommodate movement of the pin ends radially with respect to the stem and hence allow what may be termed bodily movement of the rollers transversely of or radially with respect to the stem. Accordingly, surface irregularities of stem 10 which would otherwise tend to spring the rollers or impose outward radial thrust on ends 20 and the rearward walls of recesses 21, are accommodated by bodily movement of the rollers with a consequent elimination of such bending or side thrust effects, all to obvious advantage.

It is necessary, of course, that the segmental cage or carrier be held both in assembly or encircling association with the stem and also that it be held against other than limited movement longitudinally of said stem. The means employed for releasably holding the segments against transverse separative movement comprises interengaging parts on the segments themselves, said parts being engageable and disengageable by virtue of relative longitudinal movement of the segments. The same means which is employed for releasably holding these parts in engagement when the bearing is assembled about the pipe, also is adapted to hold the bearing against other than limited movement longitudinally of the stem. This holding means is such that the bearing may be applied with equal advantage at any point along the stem and irrespective of stem surface irregularities, and at the same time does not interfere with the bodily rotation or free floating of the carrier and bearing elements about the stem.

An upwardly facing, annular shoulder 24 is provided about stem 10. In Fig. 1 this shoulder is shown on one element of a positioning assembly generally indicated at 25, said assembly being movable longitudinally along the pipe, as will be described, so it may be fixed in adjusted position and therefore serve to determine the position the bearing will occupy on the stem. However, it will be later made apparent by reference to Fig. 6 that a shoulder similar to 24 may be provided on means other than an adjustable assembly of the type shown, for instance, on the tool joint or stem coupling, itself.

Segments 15 have at their ends circumferentially overlapping projections 26 at the ends of which are oppositely projecting vertical tongues 27 fitting into complementary recesses 28 in the opposite segments. In other words, the segment ends may be considered as having L-shaped projections which are adapted to interfit in a manner to prevent transverse displacement of said segments.

The segments, with rollers 19 in mounted position, are installed by first fitting one segment about the pipe and lowering it onto shoulder 24. Then the other segment is moved against the pipe at a point above the first segment so tongues 27 may clear one another. Thereupon the second element is lowered to shoulder 24, this lowering or movement longitudinally with relation to the first segment bringing about the interfit shown in Fig. 1. This interfit prevents transverse separative movement in the direction of arrows A in Fig. 2 while the thickness of the ring segments, measured transversely, is sufficiently greater than any transversely measured clearance between the segment and stem or parts carried thereon that there can not occur sufficient relative play of the segments in the direction of arrows B (Fig. 2) to allow complete separative displacement of said segments in those directions. It will be noted that the interlocking parts of lower ring 16 are so located that roller 19' does not interfere with relative vertical movement of segments 15 during assembly or disassembly of the bearing.

With the segments thus interlocked, it only remains to hold them against relative movement axially of the stem to maintain this interlock. Where the drill stem coupling or other element on the pipe does not present a shoulder 24 at a position to locate the bearing properly on the stem it is necessary to provide two removable positioning assemblies, one at each end of carrier 14. Preferably these positioning means are individually adjustable along and settable on the stem and I have so shown them in Figs. 1 and 3. They are here shown of identical construction and are indicated at 25. It will be necessary to describe but one in detail. When occasion arises for installing the bearing elements 19 the positioning assemblies are individually adjusted and clamped in adjusted position to take the particular carriers and bearing elements which are to be used in a given situation. Each assembly 25 includes a split ring 29 which is adapted to be compressed radially about the pipe to hold it in tight frictional engagement therewith, said ring having an externally threaded portion 31 and a contiguous conical portion 32 having the external inclined or wedge face 33. Slidably mounted on conical portion 32 is a clamp ring 34 whose bore has tapering characteristics complementary to that of portions 32 whereby movement of the clamping ring longitudinally over the split ring in one direction tends to compress the latter radially to clamp it on the stem in the position to which it has been adjusted longitudinally therealong. As a means for thus moving the clamping ring, I employ a nut 36 on threaded portion 31 of ring 29, the nut also tending to hold the clamping ring releasably in clamped position. The opposed faces 24 on flanges 37 of the two rings 34 radially overlap the ends of rings 16, thus preventing other than limited longitudinal movement of carrier 14 bodily along the stem and other than limited relative movement between segments 15 of said carrier.

Due to their capacity for individual adjustment, assemblies 25 may be tightly and accurately clamped to the stem even though the surface of the stem be irregular or of different diameters at the two points of application. Furthermore, due to this individual adjustability, it is possible to employ the same set of positioning assemblies irrespective of the longitudinal extent of rollers 19 or cages 14, so if occasion arises for employing bearing elements or cages of different lengths, the same positioning assemblies may be utilized.

The proportion and adjustment of the several parts of the entire bearing assembly are such that there is annular clearance between rings 16 and 34, and also a capacity for slight end play of the carrier assemblies between the opposed faces 24. Consequently the carrier is free to "float" about stem 10 and thus it allows maximum efficiency to rollers 19. The bodily radial play of rollers 19 made possible by the radial extent of recesses 21 not only gives to the bearing the advantages enumerated above, but also allows the rollers to be compressed tightly between the drill stem casing without tending to force one side of the carrier rings into engagement with the clamp ring 34. Also due to this capacity for bodily transverse play of the rollers, when said rollers wear down they may be maintained in engagement with stem 10 when they are so pressed by the casing without imposing inward radial thrust on rings 34.

If occasion arises for replacing rollers 19, it is necessary only to loosen one nut 36 and slide the associated keeper or positioning ring 34 upwardly until one of the carrier segments (in the drawing, the left hand segment) may be lifted sufficiently to clear its tongue 27 from the recess 28 into which it fits. Thereupon, both carrier segments may be moved transversely clear of the pipe. With the carrier thus disassembled, the worn rollers 19 may be lifted out through recesses 21 and replaced with new rollers. The carrier segments are again set in position about the pipe as previously described and nut 36 screwed downwardly to carry ring 34 back into a position to retain the segments against relative longitudinal movement, care being taken to maintain the clearances set out above.

In order that the flow of circulating fluid upwardly about stem 10 may not be seriously interfered with by the bearing assembly, the ring portions 16 of carrier 14 are peripherally notched or recessed as at 38 in radial alinement with ribs 18 and hence between rollers 19. The circulating fluid may then course upwardly through recesses 38 and between the rollers.

In Fig. 5 I have shown a variational form of interlock between segments 15. In this case, the ends of the ring segments are provided with circumferentially overlapping projections 26a, but in place of tongues 27 I have provided one projection 26a of both the upper and lower ring 16 with a depending pin 27a which fits into a complementary bore 28a in the other projection. With this type of interfit, pins 27a positively prevent transverse separative movement of the segments in the directions of both arrows A and B in Fig. 2.

In Figs. 3 and 4 I have shown a variation in the form of bearing elements. With the exception of this variation, all other parts of the bearing are the same and operate precisely as do the similar elements shown in Figs. 1 and 2. I have therefore numbered the elements in Figs. 3 and 4 identically with those similar elements in Figs. 1 and 2 but with the addition of the exponent "b". It will be noted that the sectional portion of the bearing in Figure 3 is taken on a line extending radially through one of the ribs 18b in contradistinction to the sectional portion of Fig. 1 which is taken along a line intermediate adjacent ribs. In Figs. 3 and 4, the bearing elements 19b are in the form of segments, one for each carrier segment 15b, which, when the carrier 14b is assembled, are associated to form a sleeve 19c about and in peripheral engagement with stem 10b. The sleeve segments which go to make up this annular bearing ring are mounted on the individual carrier segments and are preferably made of rubber which is molded or cast about ribs 18b so as to extend radially therebeyond on both sides and preferably extend longitudinally into engagement with the opposed ring faces 23b, which faces thus serve to hold the bearing segments positively against shifting longitudinally along the carrier segments. The carrier segments may be considered not only as providing projections to be engaged by flanges 37b for holding the bearing segments in proper position, but also as reenforcements or armatures for said segments, the exposed ends 40 of the reenforcement being represented as segments of rings 16.

It will be evident that the split ring 29b and positioning rings 34b operate precisely as do the similar elements of Fig. 1 and also that the same clearances between carrier and positioning means exist. The bearing element assemblies have the same capacity for floating or freely and bodily rotating about the stem as in the assembly previously described.

In order that the bearing segments may not interfere with the relative longitudinal movement of the carrier segments when the latter are assembled or disassembled, the lower vertical parting line C of the upper carrier ring and the upper vertical parting line D are in vertical alinement with the parting line E of the sleeve segments.

If desired, sleeve segments 19b may be externally and longitudinally fluted to provide water courses 19d, preferably in vertical alinement with recesses 38b to permit upward flow of circulating fluid therethrough in the event the bearing sleeve has relatively close fit in the casing.

In Fig. 6, I have shown a bearing made in accordance with the showing of Fig. 3, but I here employ the upper exposed end 24c of tool joint or drill stem coupling 10c as the upwardly facing shoulder performing the office of shoulder 24 in Fig. 1. By utilizing this tool joint shoulder, it will be seen it is possible to dispense with one of the adjustable positioning assemblies previously described. Otherwise, the arrangement will be the same.

It will be understood the drawings and description are to be considered merely as illustrative of and not restrictive on the broader claims appended hereto, for various changes in design, structure and arrangement may be made without departing from the spirit and scope of said claims.

I claim:

1. In a bearing for drill stems or the like, a carrier adapted to encircle the stem and embodying a plurality of segments, a bearing element carried by each segment, said segments being movable transversely of the stem into and out of encircling association therewith, and inter-engaging parts on said segments to hold them releasably against transverse separative displacement, said parts being engageable and disengageable by virtue of relative longitudinal movement of said segments.

2. In a bearing for drill stems or the like, a carrier adapted to encircle the stem and embodying a plurality of segments, a bearing element carried by each segment, said segments being movable transversely of the stem into and out of encircling association therewith, inter-engaging parts on said segments to hold them releasably against transverse separative displacement, said parts being engageable and disengageable by virtue of relative longitudinal movement of said segments, and releasable means adapted to hold said segments against effective relative longitudinal movement.

3. In a bearing for drill stems or the like, a carrier adapted to encircle the stem and embodying a plurality of segments, a bearing element carried by each segment, said segments being movable transversely of the stem into and out of encircling association therewith, inter-engaging parts on said segments to hold them releasably against transverse separative displacement, said parts being engageable and disengageable by virtue of relative longitudinal movement of said segments, and a member on the stem and adjustable longitudinally therealong into and out of a position engaging the adjacent ends of the segments to hold said segment against relative longitudinal movement in given directions.

4. In a bearing for drill stems or the like, a carrier adapted to encircle the stem and embodying a plurality of segments, a bearing element carried by each segment, said segments being movable transversely of the stem into and out of encircling association therewith, inter-engaging parts on said segments to hold them releasably against transverse separative displacement, said parts being engageable and disengageable by virtue of relative longitudinal movement of said segments, and a pair of members on the stem at opposite ends of the carrier, said members being individually settable on the stem into and out of positions holding said segments against effective relative longitudinal movement.

In witness that I claim the foregoing I have hereunto subscribed my name this 31 day of January, 1930.

JAMES J. SANTIAGO.